(12) United States Patent
Chikov et al.

(10) Patent No.: US 10,665,120 B2
(45) Date of Patent: May 26, 2020

(54) SYSTEM AND METHOD FOR ENCOURAGING STUDYING BY CONTROLLING STUDENT'S ACCESS TO A DEVICE BASED ON RESULTS OF STUDYING

(71) Applicant: Kaspersky Lab ZAO, Moscow (RU)

(72) Inventors: Alexey M. Chikov, Moscow (RU); Olga O. Inozemtseva, Moscow (RU)

(73) Assignee: AO Kaspersky Lab, Moscow (RU)

( * ) Notice: Subject to any disclaimer, the term of this patent is extended or adjusted under 35 U.S.C. 154(b) by 1385 days.

(21) Appl. No.: 14/537,169

(22) Filed: Nov. 10, 2014

(65) Prior Publication Data
US 2016/0133144 A1 May 12, 2016

(51) Int. Cl.
| G09B 7/00 | (2006.01) |
|---|---|
| G09B 7/02 | (2006.01) |
| G06F 21/62 | (2013.01) |
| G06F 21/60 | (2013.01) |
| G09B 19/00 | (2006.01) |

(52) U.S. Cl.
CPC .............. *G09B 7/00* (2013.01); *G06F 21/604* (2013.01); *G06F 21/62* (2013.01); *G09B 7/02* (2013.01); *G09B 19/00* (2013.01); *G06F 2221/2111* (2013.01); *G06F 2221/2137* (2013.01); *G06F 2221/2149* (2013.01)

(58) Field of Classification Search
CPC ......... G06F 21/34; G06F 21/31; G06F 21/604
USPC ...................................................... 434/362
See application file for complete search history.

(56) References Cited

U.S. PATENT DOCUMENTS

| 5,743,743 A | 4/1998 | Ho et al. |
|---|---|---|
| 6,024,572 A | 2/2000 | Weyer |
| 6,061,684 A | 5/2000 | Glasser et al. |
| 7,036,145 B1 | 4/2006 | Murphy et al. |
| 8,387,122 B2 | 2/2013 | Toomim et al. |
| 2006/0115803 A1* | 6/2006 | Kalisiak .................. G09B 5/00 434/323 |
| 2006/0253709 A1* | 11/2006 | Cheng .................. G06F 21/577 713/182 |
| 2006/0277184 A1* | 12/2006 | Faitelson .............. G06F 21/316 |

(Continued)

FOREIGN PATENT DOCUMENTS

EP    1099997 A1    5/2001

*Primary Examiner* — Xuan M Thai
*Assistant Examiner* — Sadaruz Zaman
(74) *Attorney, Agent, or Firm* — Arent Fox LLP; Michael Fainberg

(57) ABSTRACT

Disclosed are systems, methods and computer program products for motivating and rewarding a student to study new subjects by controlling student's access to an electronic device based on results of studying. An example method includes generating, by a hardware processor, an exercise for a user based on a learning criteria; associating the exercise with an access control policy for at least one user's device; providing the exercise to the user and receiving a user's answer to the exercise; determining based on the user's answer whether to apply or not apply to the user's device the access control policy associated with the exercise; and based on the determination whether to apply or not apply the access control policy to the user's device, controlling or not controlling access of the user to the user's device.

22 Claims, 4 Drawing Sheets

(56) References Cited

U.S. PATENT DOCUMENTS

| | | | | |
|---|---|---|---|---|
| 2007/0106754 A1* | 5/2007 | Moore | | G06F 17/3089 |
| | | | | 709/217 |
| 2007/0184414 A1* | 8/2007 | Perez | | G16H 10/20 |
| | | | | 434/1 |
| 2008/0015418 A1* | 1/2008 | Jarrell | | G06Q 50/22 |
| | | | | 600/300 |
| 2008/0064018 A1* | 3/2008 | Griffin | | G06Q 10/06311 |
| | | | | 434/322 |
| 2008/0160491 A1* | 7/2008 | Allen | | G09B 7/02 |
| | | | | 434/362 |
| 2009/0087828 A1* | 4/2009 | Hartman | | G09B 7/02 |
| | | | | 434/362 |
| 2009/0158399 A1 | 6/2009 | Cooley et al. | | |
| 2012/0028230 A1* | 2/2012 | Devereux | | G09B 19/00 |
| | | | | 434/236 |
| 2012/0040326 A1* | 2/2012 | Larson-Rutter | | G09B 5/00 |
| | | | | 434/350 |
| 2013/0047229 A1 | 2/2013 | Hoefel et al. | | |
| 2013/0086258 A1* | 4/2013 | Kalgi | | H04L 63/1408 |
| | | | | 709/224 |
| 2013/0252223 A1* | 9/2013 | Jadcherla | | G09B 5/00 |
| | | | | 434/350 |
| 2014/0255889 A1* | 9/2014 | Grimes | | G09B 19/00 |
| | | | | 434/236 |
| 2014/0272847 A1* | 9/2014 | Grimes | | G09B 19/00 |
| | | | | 434/236 |
| 2014/0272894 A1 | 9/2014 | Grimes et al. | | |
| 2014/0335497 A1* | 11/2014 | Gal | | G09B 7/00 |
| | | | | 434/323 |
| 2015/0170537 A1* | 6/2015 | Super | | G09B 7/00 |
| | | | | 434/236 |
| 2016/0004820 A1* | 1/2016 | Moore | | H04W 4/21 |
| | | | | 705/3 |
| 2016/0133144 A1* | 5/2016 | Chikov | | G09B 7/00 |
| | | | | 434/362 |
| 2017/0188932 A1* | 7/2017 | Singer | | A61B 5/002 |
| 2018/0030453 A1* | 2/2018 | Zakharenko | | A61K 31/7072 |
| 2019/0197443 A1* | 6/2019 | Anderson | | G06Q 30/0283 |

* cited by examiner

SYSTEM AND METHOD FOR ENCOURAGING STUDYING BY CONTROLLING STUDENT'S ACCESS TO A DEVICE BASED ON RESULTS OF STUDYING

FIELD OF TECHNOLOGY

The disclosure relates generally to the field of education, and in particular, to systems and methods for studying by controlling user's access to a device based on results of studying.

BACKGROUND

There are many different techniques for studying new subjects, such as languages, sciences and technology. Traditional studying techniques typically involve a student reading new materials, memorizing words of a new language or using new technology to learn its working. The student than answers some questions about the new materials, and his answers are checked and graded. The student would then go over incorrect answers and review the material anew. However, if a student lacks sufficient motivation to study the new materials, the traditional studying techniques often fail to encourage the students to continue studying and improve his knowledge and mastery of new materials. Fortunately, advances in computer technologies provide new methods for studying new subjects that may be more effective in motivating students to continue studying and improving their mastery of new materials.

SUMMARY

Disclosed are systems, methods and computer program products for motivating and rewarding a student to study new subjects by controlling student's access to an electronic device based on results of studying. Generally, a user (i.e., student) of the device is provided with learning exercises, which the user needs to complete. The system can motivate the user to perform a learning exercise, for example, by adopting a policy of controlled access to the device on the basis of the results of performing the learning exercise. For example, if the learning exercise is not performed or is performed incorrectly, the policy of access control to the user's device may be applied. The user may then have the option of overcoming this policy of access control by performing the same or a different learning exercise correctly.

In one aspect, an example method for studying comprises: generating, by a hardware processor, an exercise for a user based on a learning criteria; associating the exercise with an access control policy for at least one user's device; providing the exercise to the user and receiving a user's answer to the exercise; determining based on the user's answer whether to apply or not apply to the user's device the access control policy associated with the exercise; and based on the determination whether to apply or not apply the access control policy to the user's device, controlling or not controlling access of the user to the user's device.

In one example aspect, the access control policy includes at least one of a parental control policy and network security policy.

In one example aspect, the learning criteria include at least one of a field of science, exercise difficulty and age of the user.

In one example aspect, the method further includes awarding points for the exercise performance, reflecting the result of the exercise performance by the user.

In one example aspect, the method further includes, if the number of points awarded to the user is greater than the number of points needed to apply the access control policy to the user device, the access control policy for the user device is not applied.

In one example aspect, an access control policy has an associated weight, and wherein the number of points awarded to the user is decreased by an amount equal to the weight of the policy.

In one example aspect, associating a exercise with an access control policy includes associating based on difficulty of the exercise.

In one aspect, an example system for studying includes a hardware processor configured to generate an exercise for a user based on a learning criteria; associate the exercise with an access control policy for at least one user's device; provide the exercise to the user and receiving a user's answer to the exercise; determine based on the user's answer whether to apply or not apply to the user's device the access control policy associated with the exercise; and based on the determination whether to apply or not apply the access control policy to the user's device, control or not controlling access of the user to the user's device.

In one aspect, an example computer program product, stored on a non-transitory computer readable medium, includes computer executable instructions for studying, including instructions for: generating, by a hardware processor, an exercise for a user based on a learning criteria; associating the exercise with an access control policy for at least one user's device; providing the exercise to the user and receiving a user's answer to the exercise; determining based on the user's answer whether to apply or not apply to the user's device the access control policy associated with the exercise; and based on the determination whether to apply or not apply the access control policy to the user's device, controlling or not controlling access of the user to the user's device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and together with the detailed description, serve to explain their principles and implementations.

DETAILED DESCRIPTION

Example aspects are described herein in the context of a system, method and computer program product for studying by controlling user's access to as device based on results of studying. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying, drawings. The same reference indicators will be used to the extent possible throughout the drawings and the following description to refer to the same or like items.

Figure 1:
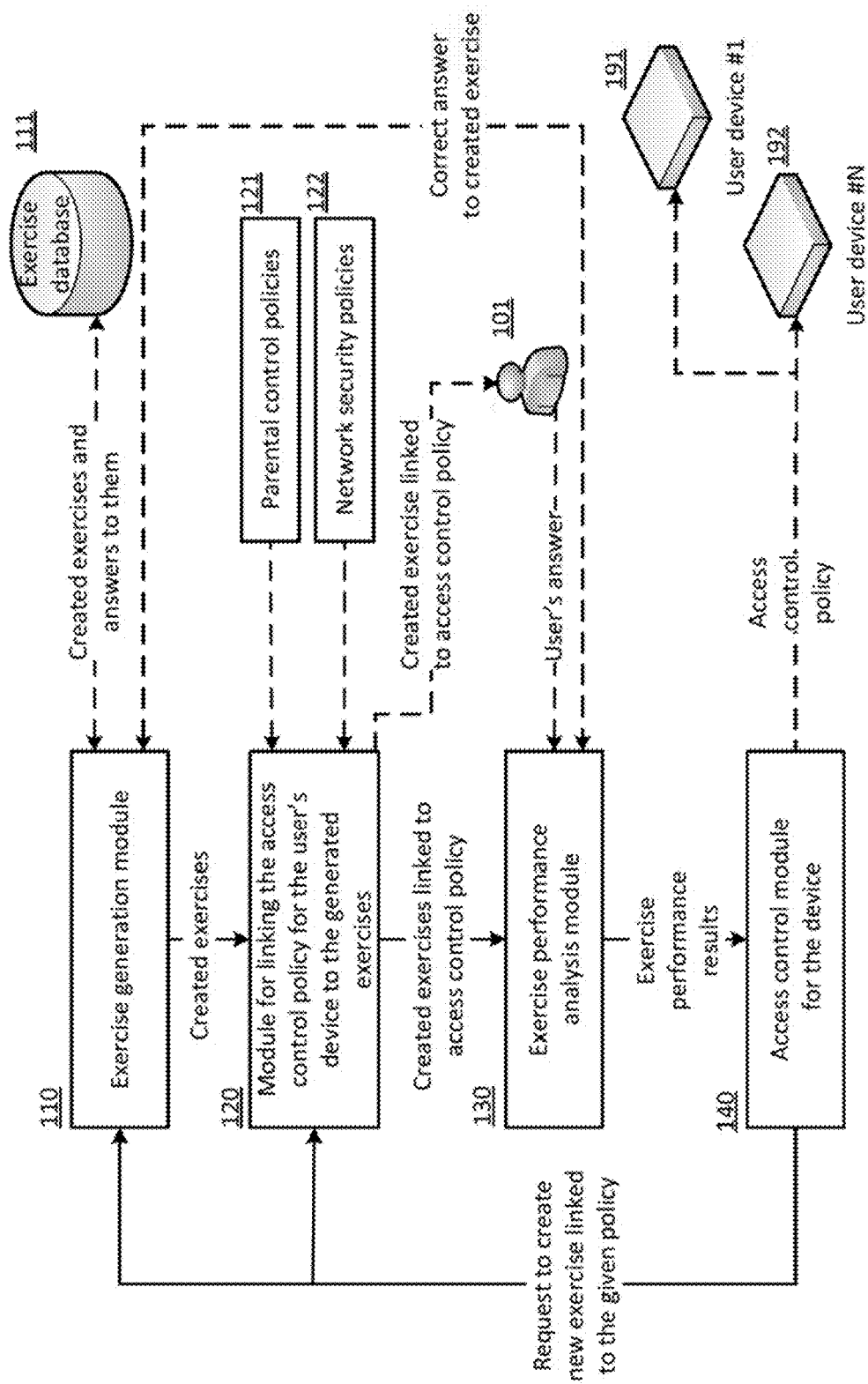
FIG. 1 illustrates an example system for encouraging studying by controlling student's access to a device based on the results of studying according to one example aspect.

FIG. 1 illustrates an example system for encouraging studying by controlling student's access to an electronic device based on the results of studying according to one example aspect of the invention. As shown, the system includes an exercise generation module 110 that creates a learning exercise that can be performed by a student (i.e., user 101) based on learning criteria. In one example aspect, the learning criterion is a discipline (an independent branch of a particular science). For example, the exercise is a problem from an academic course in the exact sciences, such as mathematics. In another example aspect, the exercise may be a problem from an academic course in the humanities, such as history.

In yet another example aspect, the learning exercise can be oriented to the study of a foreign language or the user's native language. For example, an exercise aimed at learning the grammar of one's native language or increasing one's vocabulary in a foreign language.

The exercises may not be related directly to user training, but instead improve the user's general development. In one example aspect, the exercise may be a logic task. For example, the task of separating objects by type or the task of getting out of as maze. In another example aspect, the exercise may be in the form of a game, such as a chess match.

In one example aspect, the exercise proposes that the user becomes familiarized with certain scientific, informative or literary material. For example, the exercise asks the user to read some poetry or a story. In another example aspect, the user may be asked to become familiarized with the content of a particular article, for example, one published on the Internet.

In one example aspect, the learning criterion may be the age of the user. For example, different learning exercises may be selected for users of different age.

In another example aspect, one of the learning criteria is the difficulty of the exercise. The difficulty of an exercise in the general case may be determined based on the amount of time and the amount of knowledge that the user needs to perform it. It should be noted that exercises for user groups of different ages may differ in their difficulty.

In one example aspect, the learning criterion may be the geographic region where the user is located. For example, foreign language exercises for users living on the territory of Russia Federation will not include the Russian language exercises.

In one example aspect, the exercise generation module 110 operates on the user's device, for example, a device 191. In another example aspect, the exercise generation module 110 operates on a server or as a cloud service. The created exercises may be stored in a database 111, which in turn can reside either on the users device or on a server.

In one example aspect, the exercise generation module 110 creates the correct results (or answers) of performing the exercises. The correct results of performing the exercise can also be stored in the database 111 along with the exercises. For example, if the exercise pertains to the field of humanities, the correct result of its performance might not be calculated by a computer system. In this case, the correct result of the performance can be created along with the exercise. For example, for a history exercise involving the reign of a particular king, it is necessary to store the correct result of performance (in this case, the true answer to the question of the exercise), since it cannot be calculated automatically.

A module of linking the access control policy for the users device to a generated exercise 120 links (or associates) the exercise generated by the exercise generation module 110 to access control policies for the device 191, such as parental control policies 121 and network security policies 122. In one example aspect, parental control policies 121 may include, but not limited to: a policy controlling access to the Internet; as policy controlling the running of an application; a policy controlling a group of possible user actions when using an application; a policy controlling the time of use of the user's device; and a policy controlling the time of use of an application by the user. In another example aspect, the network security policies 122 may include, but not limited to restrictions on the use of applications, restrictions on the use of the Internet, and restrictions on a group of users in certain segments of the network (e.g., application of above listed parental control policies depending on network segments).

In another example aspect, the linking of the created exercise to a security policy consists in determining the access control policy for the user device 191, which can be applied to the device on the basis of the result of performance of the created exercise by the user.

In one example aspect, several access control policies for the device can be linked to the same exercise. For example, the exercise may be linked to a policy limiting access to the Internet and to a policy forbidding the running of an application on the user's device.

In another example aspect, several exercises may be linked to the same access control policy for the user's device. For example, a policy for limiting access to the Internet can be linked to an exercise in mathematics and to an exercise in a foreign language.

In one example aspect, the module of linking the access control policy for the user's device to the created exercise 120 may save all the relationships between created exercises and linked access control policies (i.e., exercise-policy relationship) in a database 111.

In another example aspect, for the linking of the created exercise to the access control policy, the module of linking the access control policy for the user's device to the created exercise 120 takes into account the history of linking of exercises to the access control policies and automatically links the created exercises to the access control policies. For example, if a new exercise has been created, a selection may be done from a database storing the previously created exercise-policy relationships. The selection will be done in consideration of the criteria of the exercise, for example, all relationships will be selected that link the access control policies to exercises having the same criteria as the new created exercise. One or more policies ending up in the selection can then be automatically linked to the new exercise.

In one example aspect, the module of linking the access control policy for the user's device to the created exercise 120 considers the difficulty of the exercise when producing the linkage. For example, if the exercise is oriented to learning one word in a foreign language, it can be automatically linked to a policy controlling access to a particular application. If the exercise teaches the user 10 words of a foreign language, it can be automatically linked to a policy controlling access to all applications on the user's device 191.

An exercise performance analysis module 130 analyzes the performance of the exercise created by the exercise generation module 110, and computes the result of the performance of the exercise by the user 101.

In one example aspect, the result of performing the exercise can be considered on a performed/failed basis. For example, if the user makes a mistake in performing the exercise, it is considered that the exercise was failed.

In another example aspect, the result of performing the exercise may be considered using a point-based system, reflecting the result of the user's performance of the exercise. In this case, points are calculated, for example, on a scale of 1 to 10, for the performing of the exercise by the user. If the exercise is completely performed, the maximum number of points is awarded. Furthermore, the difficulty of the exercise performed may be considered when awarding the points. For example, if the user has performed an exercise which teaches him a single foreign word, 3 points may be awarded. If the user performs an exercise teaching him 3 new foreign words, then 10 points may be awarded.

In one example aspect, some exercises may have only one correct answer. For example, the exercise of multiplying two numbers. The module of analysis of exercise performance 130 computes the correct result of performing the exercise and compares this with the answer of the user. In another example aspect, other exercises may have several correct answers. For example, the exercise of learning new words in a foreign language. In this case, the exercise performance analysis module 130 analyzes the words entered by the user and compares them to the correct answer choices. If the user is wrong about one of the words, yet the system is considering the result of the exercise performance using a point-based system, the user may be awarded a limited number of points. If the exercise was performed partially, a partial number of points may be awarded.

For example, if the user was able to learn 2 out of 3 foreign words, he is awarded 6 out of 10 possible points. In one example aspect, the points system can also be applied to exercises having a single correct answer. For example, if it is necessary to multiply the number "123" by "45", the correct answer of performing the exercise is unambiguous and equal to "5535". But if the user's answer contains, for example, "5525", then the user has probably made a mistake due to lack of attention in performing the exercise. In one example aspect, the order of the resulting number, the numerical similarity or the absolute error can be considered in the answer. In the example given, the order of the numbers of the correct answer and the user's answer is the same, the correct answer differs from the user's answer by no more than one digit, and the absolute error of the computations is less than one percent. In such a case, the user may be awarded, for example, 7 out of 10 possible points.

Another example can be the performance of an exercise in the humanities, such as history. If it is necessary to perform an exercise requiring one to indicate the reign of a particular king, the correct result of the performance is known and unambiguous. For example, the period from 1800 to 1810. If the user has forgotten the exact values, yet remembers that it was at the beginning of the 19th century, he may give an answer of, for example, 1805 to 1815. In this case, with no knowledge of history there is little likelihood of indicating close figures in the answer, and so the user may be awarded, for example, 5 out of 10 possible points.

In another example aspect, an exercise performance analysis module 130 requests from the exercise creation module 110 the correct result (or answer) of performance of the exercise and compares the user's answer with the correct result of performance of the exercise.

In one example aspect, an exercise performance analysis module 130 can use a group of answer choices to assess the correctness of exercise performance. The group of answer choices may contain one correct answer, several correct answers, or no correct answer. For example, after reading an e-book the user can select one choice of a synopsis of this book.

In one example aspect, the exercise performance analysis module 130 can use a test to evaluate the correctness of exercise performance. For example, if the user has performed a geography exercise, for example, familiarized himself with general information about a particular country, he may be given a test on material he has read. The test may include a series of questions that the user has to answer. For example, on which continent is the country located, what city is the capital of the country, what is the population, and so on.

In one example aspect, the exercise performance analysis module 130 may also analyze the behavior of the user in performing the exercise to identify abnormal behavior. For example, if the exercise involves reading an e-book, and the user has performed the reading of the book at abnormally high speed, the exercise might not be considered performed. For example, if the user has read through 20 pages of an e-book in 20 seconds, such high reading speed would be considered abnormal, and it is most likely that the user simply scrolled through the book from beginning to end without delving into the contents of the book.

In one example aspect, a module of access control to the device 140 on the basis of the results of performance of the exercise by the user and the results obtained from the exercise performance analysis module 130 applies the access policy for the user's device that is linked to the given exercise. For example, module 140 may restrict user's access to the Internet.

In one example aspect, the module of access control to the device 140 observes the actions of the user. On the basis of observing the actions of the user, a decision is made to apply access control policies for the device 191. For example, if the user does not use the Internet for his work, the policy limiting access to the Internet will not be applied to the device.

In another example aspect, points for exercise performance may be accumulated. For each policy, the module of access control to the device 140 determines a weight of that policy. A weight is the number of points needed in order to overcome that access control policy. In one example aspect, the weight of an access control policy is proportional to the difficulty of the related exercise. If the user has performed several exercises, the exercise performance analysis module 130 calculates a certain number of points reflecting the overall result of the exercise performance. If a situation arises where it is necessary to apply an access control policy for the device, the number of points awarded to the user is taken into account. If the number of points awarded to the user is greater than what is needed to apply the policy, the access control policy for the device is not applied. The number of awarded points may be decreased by an amount equal to the weight of the policy. Furthermore, in one example aspect, the points may be decreased to zero after the lapsing of a particular interval of time, for example, when a new day begins.

In one example aspect, the module of access control to a device 140 prompts the user to perform the generated exercise. If the exercise is performed incorrectly, the module of access control to the device 140 may prompt the user to perform the same exercise once again. In another example aspect, the module of access control to the device 140 may request the creation of a new exercise by the exercise generation module 110 and a linking of the new exercise to the current policy by the module of linking the access control policy for the user's device to the created exercise 120. In one example aspect, the linking of the new exercise to the current policy accounts for the weight of the policy.

In one example aspect, the module of access control to the device 140 applies access control policies for a particular user device 191. In another example aspect, the module of access control to the device 140 applies access control policies to all the devices of the user, for example, to the device 191 and to a device 192.

In one example aspect, the module of access control to the device 140 saves the history of exercise performance by the user 101 in order to change the criteria of the exercises being created by the exercise generation module 110. In one example aspect, based on the history of performance, a new exercise can have heightened difficulty. In another example aspect, based on the performance history a new exercise can have a different discipline. In yet another particular example aspect, based on the performance history the new exercise can have a different age category. For example, if the user successfully performs mathematics exercises in the course of one year, it is necessary to change the age category of the exercises. If the user is not able to correctly perform exercises in, for example, a foreign language, it is necessary to reduce the difficulty of the exercises. If after changing the age category and difficulty of the exercises the user performs the exercises as fast and as correctly as before, it is necessary to change the area of learning for the all-round development of the user.

Figure 2:
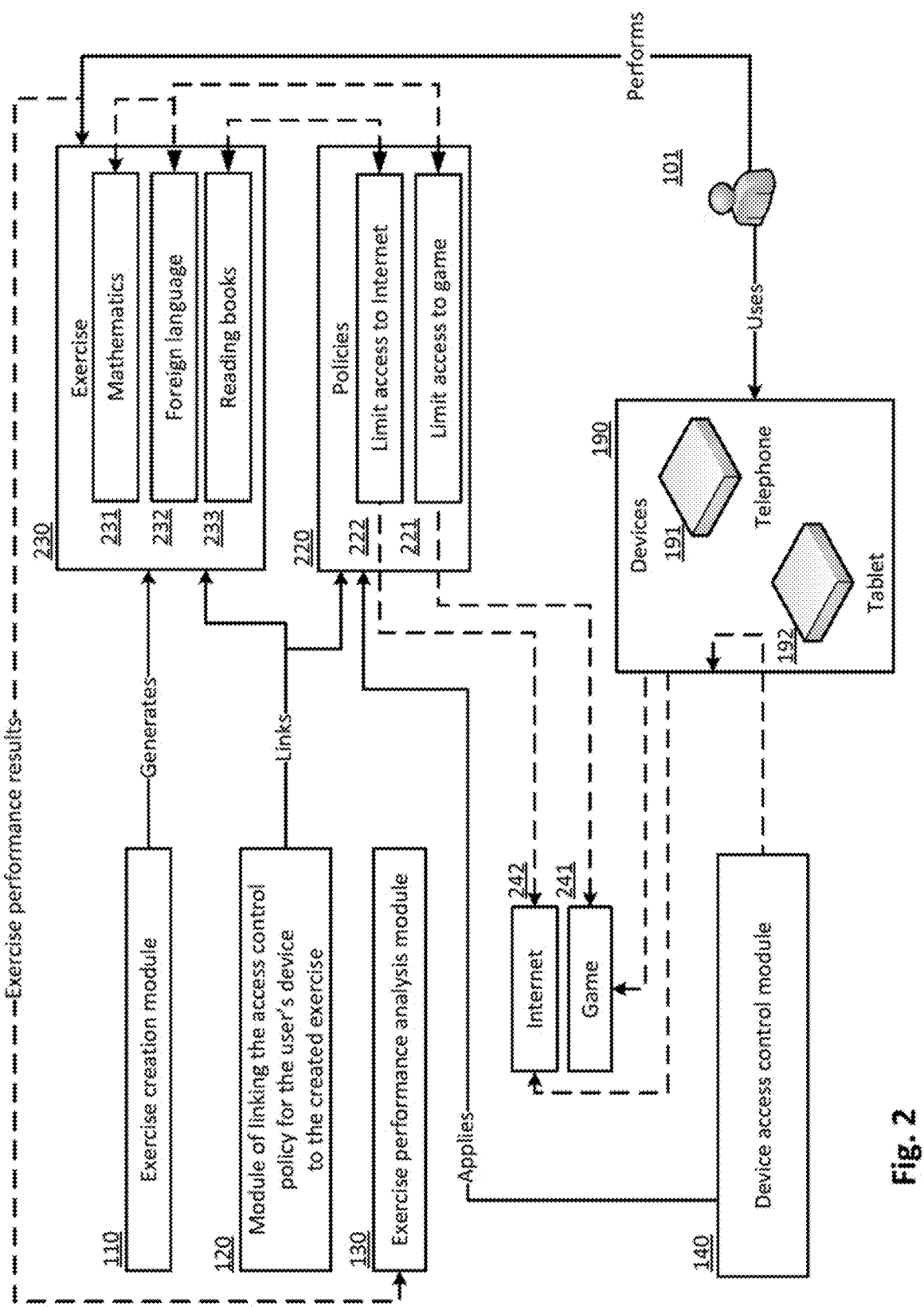
FIG. 2 illustrates an example of the use of the system for studying by controlling students of access to a device according to one example aspect.

FIG. 2 illustrates an example use of the above-described system for motivating and rewarding a student to study new subjects by controlling student's access to an electronic device based on results of studying according to one example aspect of the invention. An underage child user 101 is working with devices 190. The policies of access control to the device 220 are parental control policies. For example, policy 222 prohibits access to the Internet 242 continuously for more than 30 minutes and, policy 221 prohibits use of a game application 241 for more than 15, after which access to the Internet 242 and operation of the game application 241 is blocked. In one example aspect, the exercise generation module 110 creates, for example, three exercises 230 (the three exercises shown in FIG. 2 are illustrative, the actual exercises and their types may be greater). The first exercise 231 is to perform a mathematics task. The second exercise 232 is to learn at least three foreign words. The third exercise 233 is to read an e-book for at least 15 minutes. The first two exercises 231 and 232 are linked by the module of linking the access control policy for the user's device to the created exercise 120 to the access control policy for the game application 241, and the third exercise 233 is linked to the access control policy for the Internet 242.

The user 101, when using the device 191, such as a telephone, does not perform the created exercises. For example, he does not study mathematics and does not read e-books, but instead runs the game application 241. The module of analysis of exercise performance results 130 does not record a successful performance of the exercises 230. After 15 minutes, the module of access control to the device 140, based on the results of performance of the exercises 230, which were not performed, asks the user 215 to perform the exercise 231 or 232. The user 101 declines the invitation, and the module of access control to the device 140 applies the policy 221, limiting the running of the game application 241, and determines its weight, for example, equal to 8. After this, the user 101 goes onto the Internet 242 from the device 191. After 15 minutes, the module of access control to the device 140, based on the results of performance of the exercises 230, which were not performed, asks the user 215 to perform the exercise 233. The user 215 declines the invitation, and the module of access control to the device 140 applies the policy 222, limiting access to the Internet 242, and determines its weight, for example, equal to 10.

The user 101 begins working with the second device 192, such as a tablet. However, the running of the game application 241 and access to the Internet 242 are limited, since the module of access control to the device 140 has applied the policies 221 and 222 to all the devices 190, including table 192, which the user 101 is using.

The user 101 tries to run the game application 241, and the module of access control to the device 140 asks the user 101 to perform the exercises 231 and 232. The user 101 performs the two exercises with mistakes, and the exercise performance analysis module 130 analyzes the exercise performance, computing the points for performing each one. For example, the mathematics exercise 231 was performed with a typo, and it is awarded 3 points. The foreign language exercise 232 was performed with the result "2 words learned", for which it is awarded 6 points. The module of access control to the device 140 on the basis of the performance results adds the points (in all, the user 101 was awarded 8 points) and removes the restrictions on running the game application 241, canceling the policy 221. The user 101 meanwhile decides to look at something on the Internet 242. The module of access control to the device 140 asks the user 101 to perform the exercise 233. During the performance of the exercise, the user 101 becomes interested in the contents of an e-book, which has to be read during the performance of the exercise 233, and continues to read it for 1 hour. As a result, the exercise 233 has been performed 4 times. The exercise performance analysis module 130 awards points for each performance (for example, 10 points each), the module of access control to the device 140 adds up the awarded points (for example, 40 points) and cancels the restrictions of the policy 222, decreasing the number of accumulated points by the weight of the policy 222. After becoming familiar with the material, the user 101 goes onto the Internet 242 and uses it for 35 minutes. The module of access control to the device 140 does not again apply the policy 222, since the exercise 233 was performed more than once, and the accumulated points (30) are enough to not apply the policy 222 (every 15 minutes the weighting of the policy 222 is subtracted from the number of accumulated points). After this, the user 101 turns off the device 192 and goes to bed. At midnight, all accumulated points are set at zero by the module of access control to the device 140.

Figure 3:
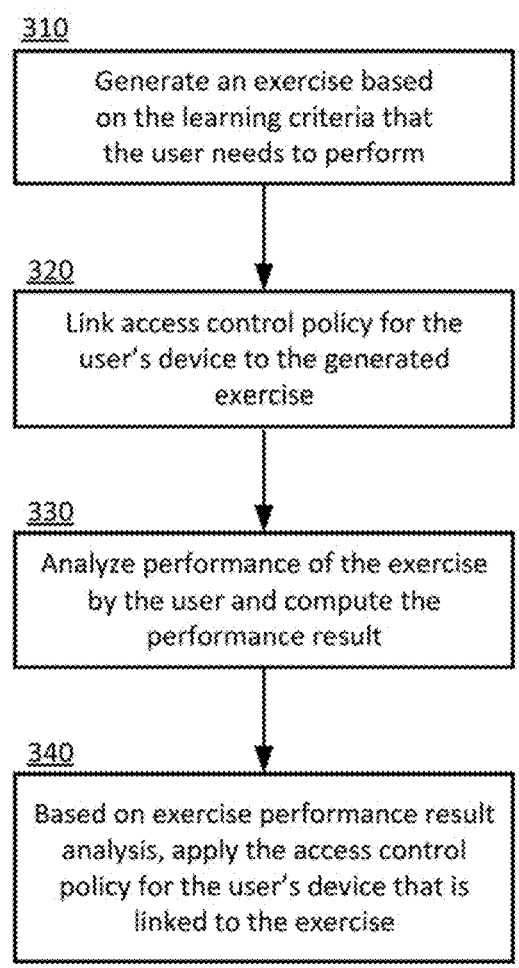
FIG. 3 illustrates an example method for encouraging studying by controlling student's access to a device based on the results of studying according to one example aspect.

FIG. 3 illustrates an example method for encouraging studying by controlling student's access to an electronic device based on the results of studying according to one example aspect of the invention. At the initial stage 310, an exercise is created on the basis of the learning criteria, which the user has to perform. In one example aspect, the learning criterion is a field of science. In another example aspect, the learning criterion is the exercise difficulty. In yet another example aspect, the learning criterion is the age of the user. In one example aspect, the exercise for performance by the user is stored in a database, and the database containing the exercises can reside either on the user's device or on a remote server.

Next, in step 320, the access control policy for the user's device is linked to the created exercise. In one example aspect, the access control policies for the user's device are determined by parental control policies and/or network security policies.

Next, in step 330, the performance of the exercise is analyzed and the result of the exercise performance by the user is computed. In one example aspect, the exercise is considered to be failed if the user makes a mistake during the exercise performance. In another example aspect, points are awarded for the exercise performance, reflecting the result of the exercise performance by the user.

Finally, in step 340, on the basis of the analysis of the exercise performance result, an access control policy for the user's device linked to the exercise is applied. In one example aspect, the awarded points are considered when applying the access control policy for the user's device. In another example aspect, the access control policy for the user's device is applied to all devices of the user. In yet another example aspect, after applying the access control policy to the user's device, a new exercise linked to the policy applied is generated.

Figure 4:
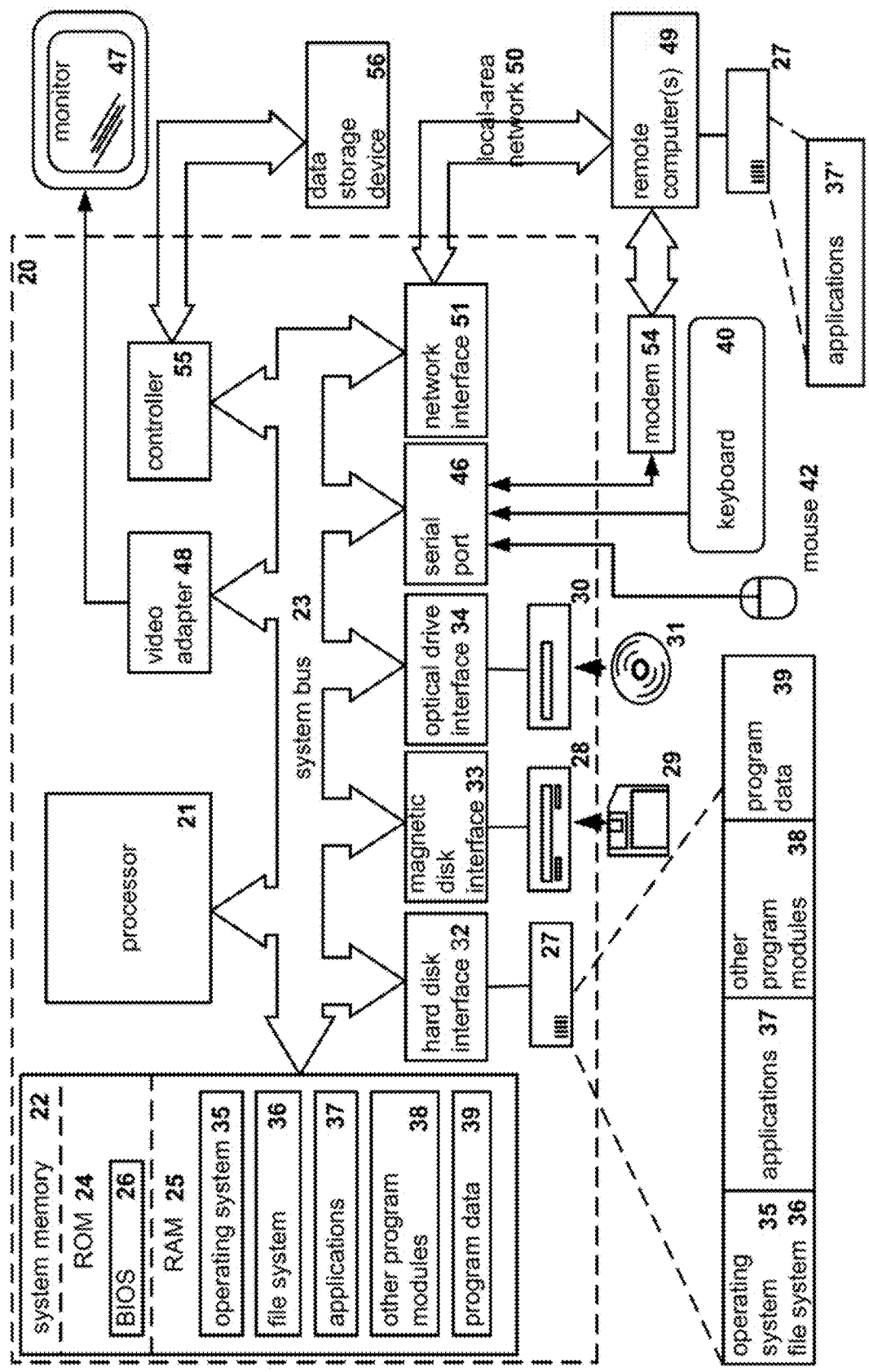
FIG. 4 illustrates an example of a general-purposes computer system suitable for implementing the disclosed systems and methods for encouraging studying by controlling student's access to a device based on the results of studying according to one aspect.

FIG. 4 shows an example of a general-purpose computer system (which may be a personal computer or a server) 20, which may be used to implement system and methods for encouraging studying by controlling student's access to an electronic device based on the results of studying disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for studying, the method comprising:
   generating, by a hardware processor, an exercise for a user based on a learning criteria;
   associating the exercise with an access control policy for at least one user's device;
   providing the exercise to the user and receiving a user's answer to the exercise;
   analyzing a behavior of the user based on the receiving of the user's answer to determine whether an abnormality exists in a duration of time spent for performing the exercise, the abnormality being determined based on a duration between providing the exercise to the user and receiving the user's answer;
   determining, based on the user's answer and the determination of whether the abnormality exists, whether to apply or not apply to the user's device the access control policy associated with the exercise; and
   based on the determination whether to apply or not apply the access control policy to the user's device, controlling or not controlling access of the user to the user's device.

2. The method of claim 1, wherein the access control policy includes at least one of a parental control policy and a network security policy.

3. The method of claim 1, wherein the learning criteria include at least one of a field of science, exercise difficulty and an age of the user.

4. The method of claim 1, further comprising:
   awarding points for the exercise performance, a number of points awarded reflecting a result of the exercise performance by the user.

5. The method of claim 4, further comprising:
   if the number of points awarded to the user is greater than the number of points needed to apply the access control policy to the user device, not applying the access control policy for the user device.

6. The method of claim 4, wherein the access control policy has an associated weight, and wherein the number of points awarded to the user is decreased by an amount equal to the weight of the policy.

7. The method of claim 1, wherein the association of the exercise with the access control policy includes associating the exercise and the access control policy based on a difficulty of the exercise.

8. A system for studying, the system comprising:
   a hardware processor configured to:
   generate an exercise for a user based on a learning criteria; associate the exercise with an access control policy for at least one user's device;
   provide the exercise to the user and receive a user's answer to the exercise;
   analyze a behavior of the user based on the reception of the user's answer to determine whether an abnormality exists in a duration of time spent for performing the exercise, the abnormality being determined based on a duration between providing the exercise to the user and receiving the user's answer;
   determine, based on the user's answer and the determination of whether the abnormality exists, whether to apply or not apply to the user's device the access control policy associated with the exercise; and
   based on the determination whether to apply or not apply the access control policy to the user's device, control or not controlling access of the user to the user's device.

9. The system of claim 8, wherein the access control policy includes at least one of a parental control policy and a network security policy.

10. The system of claim 8, wherein the learning criteria include at least one of a field of science, exercise difficulty and an age of the user.

11. The system of claim 8, the processor further configured to:
    award points for the exercise performance, a number of points awarded reflecting a result of the exercise performance by the user.

12. The system of claim 11, the processor further configured to:
    if the number of points awarded to the user is greater than the number of points needed to apply the access control policy to the user device, do not apply the access control policy for the user device.

13. The system of claim 11, wherein the access control policy has an associated weight, and wherein the number of points awarded to the user is decreased by an amount equal to the weight of the policy.

14. The system of claim 8, wherein associating an exercise with an access control policy includes associating based of difficulty of the exercise.

15. A computer program product, stored on a non-transitory computer readable medium, wherein the computer program product includes computer executable instructions for studying, including instructions for:
   generating, by a hardware processor, an exercise for a user based on a learning criteria;
   associating the exercise with an access control policy for at least one user's device;
   providing the exercise to the user and receiving a user's answer to the exercise;
   analyzing a behavior of the user based on the receiving of the user's answer to determine whether an abnormality exists in a duration of time spent for performing the exercise, the abnormality being determined based on a duration between providing the exercise to the user and receiving the user's answer;
   determining, based on the user's answer and the determination of whether the abnormality exists, whether to apply or not apply to the user's device the access control policy associated with the exercise; and
   based on the determination whether to apply or not apply the access control policy to the user's device, controlling or not controlling access of the user to the user's device.

16. The computer program product of claim 15, wherein the access control policy includes at least one of a parental control policy and a network security policy.

17. The computer program product of claim 15, wherein the learning criteria include at least one of a field of science, exercise difficulty and an age of the user.

18. The computer program product of claim 15, the instructions further comprising instructions for:
   awarding points for the exercise performance, a number of points awarded reflecting a result of the exercise performance by the user.

19. The computer program product of claim 18, the instructions further comprising:
   if the number of points awarded to the user is greater than the number of points needed to apply the access control policy to the user device, not applying the access control policy for the user device.

20. The computer program product of claim 18, wherein the access control policy has an associated weight, and wherein the number of points awarded to the user is decreased by an amount equal to the weight of the policy.

21. The method of claim 1, wherein the exercise is determined to be not performed when the abnormality is determined to exist.

22. The method of claim 1, further comprising:
   based on the determination whether to apply or not apply the access control policy to the user's device, controlling or not controlling access of the user to all of the user's devices.

* * * * *